US012211440B2

(12) United States Patent
Yang et al.

(10) Patent No.: US 12,211,440 B2
(45) Date of Patent: Jan. 28, 2025

(54) STARTING SIGNAL PROVIDING MODULE, METHOD AND SPLICING DISPLAY DEVICE

(71) Applicant: BOE Technology Group Co., Ltd., Beijing (CN)

(72) Inventors: Hualing Yang, Beijing (CN); Lina Liu, Beijing (CN); Wenxiu Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/914,655

(22) PCT Filed: Nov. 12, 2021

(86) PCT No.: PCT/CN2021/130336
§ 371 (c)(1),
(2) Date: Sep. 26, 2022

(87) PCT Pub. No.: WO2022/222444
PCT Pub. Date: Oct. 27, 2022

(65) Prior Publication Data

US 2024/0249675 A1 Jul. 25, 2024

(30) Foreign Application Priority Data

Apr. 23, 2021 (CN) ......................... 202110440850.3

(51) Int. Cl.
*G09G 3/3233* (2016.01)

(52) U.S. Cl.
CPC ..... *G09G 3/3233* (2013.01); *G09G 2300/026* (2013.01); *G09G 2300/0814* (2013.01); *G09G 2310/0243* (2013.01); *G09G 2360/04* (2013.01)

(58) Field of Classification Search
CPC ........... G09G 3/3233; G09G 2300/026; G09G 2300/0814; G09G 2310/0243; G09G 2360/04; G06F 3/04
See application file for complete search history.

(56) References Cited

U.S. PATENT DOCUMENTS

2007/0080905 A1* 4/2007 Takahara ............ G09G 3/3258 345/76
2009/0122046 A1* 5/2009 Minami .............. G09G 3/3233 345/211

(Continued)

FOREIGN PATENT DOCUMENTS

CN 105225651 A 1/2016
CN 109448642 A 3/2019

(Continued)

OTHER PUBLICATIONS

PCT/CN2021/130336 international search report and written opinion.

*Primary Examiner* — Kwin Xie
(74) *Attorney, Agent, or Firm* — IPro, PLLC

(57) ABSTRACT

A starting signal providing module, a starting signal providing method and a splicing display device are provided. The starting signal providing module comprises a detection circuit, a plurality of signal generating circuits and a plurality of enabling circuits. The signal generating circuit is configured to generate and provide a feedback signal to the detecting circuit when a last-stage scan driving signal output terminal of a scan driving circuit in a corresponding display panel outputs a valid scan driving signal. The detection circuit is configured to provide an enabling control signal to enabling circuits corresponding to at least two signal generating circuits according to the feedback signals from at least two signal generating circuits. The enabling circuit is configured to control a starting signal to be supplied to a (Continued)

scan driving circuit included in a corresponding display panel upon receiving the enabling control signal.

13 Claims, 6 Drawing Sheets

(56) References Cited

U.S. PATENT DOCUMENTS

| | | | | |
|---|---|---|---|---|
| 2017/0132986 | A1* | 5/2017 | Liang | G09G 3/3696 |
| 2020/0159054 | A1* | 5/2020 | Jeong | G09G 3/32 |
| 2020/0394968 | A1* | 12/2020 | Kwon | G09G 3/3266 |
| 2024/0053879 | A1* | 2/2024 | Wang | G09G 5/14 |

FOREIGN PATENT DOCUMENTS

| | | | |
|---|---|---|---|
| CN | 111210750 | A | 5/2020 |
| CN | 111243485 | A | 6/2020 |
| CN | 113178159 | A | 7/2021 |
| JP | 2015179138 | A | 10/2015 |

* cited by examiner

STARTING SIGNAL PROVIDING MODULE, METHOD AND SPLICING DISPLAY DEVICE

CROSS-REFERENCE TO RELATED APPLICATION

This application is the U.S. national phase of PCT Application PCT/CN2021/130336 filed on Nov. 12, 2021, which claims priority to Chinese Patent Application No. 202110440850.3 filed in China on Apr. 23, 2021, the entire contents of which are hereby incorporated by reference.

TECHNICAL FIELD

The present disclosure relates to the field of display, in particular to a starting signal providing module, a starting signal providing method and a splicing display device.

BACKGROUND

The related splicing display device comprises a plurality of display panels, one display panel corresponds to one display driving integrated circuit and one flexible circuit board, and asynchronous display can exist between different display panels, so that image quality loss can be brought.

SUMMARY

In one aspect, the present disclosure provides a starting signal providing module, which is applied to a splicing display device, where the splicing display device includes at least two display panels; the display panel comprises a gate driving circuit; the scan driving circuit comprises a plurality of cascaded scan driving units; the starting signal providing module comprises a detection circuit, a plurality of signal generating circuits and a plurality of enabling circuits; the signal generating circuit corresponds to the display panel, and the enabling circuit corresponds to the display panel and the signal generating circuit respectively:

the signal generating circuit is configured to generate and provide a feedback signal to the detecting circuit when a last-stage scan driving signal output terminal of a scan driving circuit in a corresponding display panel outputs a valid scan driving signal;

the detection circuit is electrically connected to the plurality of signal generating circuits and is configured to provide an enabling control signal to enabling circuits corresponding to at least two signal generating circuits according to the feedback signals from at least two signal generating circuits;

the enabling circuit is configured to control a starting signal to be supplied to a scan driving circuit included in a corresponding display panel upon receiving the enabling control signal.

Optionally, the signal generating circuit includes an indication signal output terminal, and the signal generating circuit is electrically connected to a first-stage scan driving signal output terminal of a scan driving circuit in a corresponding display panel and a last-stage scan driving signal output terminal of a scan driving circuit in a corresponding display panel, and is configured to control to output a first voltage signal through the corresponding indication signal output terminal when the first-stage scan driving signal output terminal outputs a valid scan driving signal, and control to output a second voltage signal through the corresponding indication signal output terminal when the last-stage scan driving signal output terminal outputs a valid scan driving signal; the feedback signal is the second voltage signal;

the detection circuit comprises enabling control signal output terminals, the detection circuit is electrically connected to the indicating signal output terminals of the signal generating circuits, and is configured to provide enabling control signals for the enabling circuits corresponding to the at least two signal generating circuits through the enabling control signal output terminals when the indicating signal output terminals of the at least two signal generating circuits output second voltage signals;

the enabling circuit is electrically connected to the starting signal terminal and is configured to control the starting signal to be provided for a first-stage scan driving unit in the scan driving circuit included in the corresponding display panel through the starting signal terminal when the enabling control signal is received.

Optionally, the signal generating circuit includes a first generating circuit and a second generating circuit;

the first generating circuit is and electrically connected to a first voltage terminal, the corresponding indicating signal output terminal and a first-stage scan driving signal output terminal of the corresponding scan driving circuit in the display panel, and is configured to control the communication between the corresponding indicating signal output terminal and the first voltage terminal when the first-stage scan driving signal output terminal of the corresponding scan driving circuit in the display panel outputs a valid scan driving signal; the first voltage terminal is configured to provide the first voltage signal;

the second generating circuit is electrically connected to a second voltage terminal, the corresponding indicating signal output terminal and the last-stage scan driving signal output terminal of the corresponding scan driving circuit in the display panel, and is configured to control the communication between the corresponding indicating signal output terminal and the second voltage terminal when the last-stage scan driving signal output terminal of the corresponding scan driving circuit in the display panel outputs a valid scan driving signal; the second voltage terminal is configured to provide a second voltage signal.

Optionally, the first generating circuit includes a first transistor, and the second generating circuit includes a second transistor:

a control electrode of the first transistor is electrically connected to the first-stage scan driving signal output terminal of a scan driving circuit in the corresponding display panel, a first electrode of the first transistor is electrically connected to the first voltage terminal, and a second electrode of the first transistor is electrically connected to the corresponding indication signal output terminal;

and the control electrode of the second transistor is electrically connected to the last-stage of scan driving signal output terminal of the scan driving circuit in the corresponding display panel, the first electrode of the second transistor is electrically connected to the second voltage terminal, and the second electrode of the second transistor is electrically connected to the corresponding indicating signal output terminal.

Optionally, the enabling circuit includes a third transistor:

a control electrode of the third transistor is electrically connected to the enabling control signal output terminal, a first electrode of the third transistor is electrically connected to the starting signal terminal, and a second electrode of the third transistor is electrically connected to an input terminal of a first-stage scan driving unit in a scan driving circuit included in the corresponding display panel; the starting signal terminal is configured to provide a starting signal.

Optionally, the detection circuit includes an OR-gate and an enabling control signal generating circuit; the first voltage signal is a high voltage signal, and the second voltage signal is a low voltage signal;

a plurality of input terminals of the OR-gate are respectively electrically connected to the indicating signal output terminals of the plurality of signal generating circuits, and the output terminal of the OR-gate is electrically connected to the enabling control signal generating circuit;

the enabling control signal generating circuit is electrically connected to the enabling control signal output terminal and is configured to control the enabling control signal to be output through the enabling control signal output terminal when the output terminal of the OR-gate outputs a low-voltage signal.

Optionally, the signal generating circuit includes an indication signal output terminal, and the signal generating circuit is electrically connected to a last-stage scan driving signal output terminal of a corresponding scan driving circuit in the display panel, and is configured to control, when the last-stage scan driving signal output terminal outputs a valid scan driving signal, to output a third voltage signal to the detecting circuit through the corresponding indication signal output terminal; the feedback signal is the third voltage signal;

the detection circuit comprises enabling control signal output terminals, the detection circuit is electrically connected to the indicating signal output terminals of the signal generating circuits, and is configured to provide enabling control signals for enabling circuits corresponding to the at least two signal generating circuits through the enabling control signal output terminals when the indicating signal output terminals of the at least two signal generating circuits output third voltage signals;

the enabling circuit is electrically connected to the starting signal terminal and the indicating signal output terminal, and is configured to control the starting signal to be provided for a first-stage scan driving unit in a scan driving circuit included in the corresponding display panel through the starting signal terminal and providing a fourth voltage signal for the indicating signal output terminal of the corresponding signal generating circuit when the enabling control signal is received.

Optionally, the signal generating circuit is disposed in a peripheral area of the corresponding display panel.

In a second aspect, an embodiment of the disclosure further provides a starting signal providing method applied to the starting signal providing module, where the starting signal providing method includes:

when the last-stage of scan driving signal output terminal of the scan driving circuit in the corresponding display panel outputs a valid scan driving signal, the signal generating circuit generates and provides a feedback signal for the detection circuit;

the detection circuit provides enabling control signals to enabling circuits corresponding to at least two signal generating circuits according to the feedback signals from the at least two signal generating circuits;

and when the enabling circuit receives the enabling control signal, controlling to provide a starting signal to a scan driving circuit included in the corresponding display panel.

Optionally, the method for providing a starting signal according to at least one embodiment of the present disclosure includes:

when the first-stage scan driving signal output terminal of the corresponding scan driving circuit in the display panel outputs a valid scan driving signal, the signal generating circuit controls to output a first voltage signal through the corresponding indication signal output terminal, and when the last-stage scan driving signal output terminal of the corresponding scan driving circuit in the display panel outputs a valid scan driving signal, the signal generating circuit controls to output a second voltage signal through the corresponding indication signal output terminal; the feedback signal is the second voltage signal;

when the indicating signal output terminals of at least two signal generating circuits output second voltage signals, the detection circuit provides enabling control signals for enabling circuits corresponding to the at least two signal generating circuits;

when the enabling circuit receives the enabling control signal, the enabling circuit controls to provide a starting signal to a first-stage scan driving unit in a scan driving circuit included in the corresponding display panel through the starting signal terminal.

Optionally, the method for providing a starting signal according to at least one embodiment of the present disclosure includes:

when the last-stage of scan driving signal output terminal of the corresponding scan driving circuit in the display panel outputs a valid scan driving signal, the signal generating circuit controls to output a third voltage signal to the detection circuit through the corresponding indicating signal output terminal; the feedback signal is the third voltage signal;

when the indicating signal output terminals of at least two signal generating circuits output third voltage signals, the detection circuit provides enabling control signals for enabling circuits corresponding to the at least two signal generating circuits;

when the enabling circuit receives the enabling control signal, the enabling circuit controls to provide a starting signal to a first-stage scan driving unit in a scan driving circuit included in the corresponding display panel through the starting signal terminal, and provides a fourth voltage signal to an indication signal output terminal of the corresponding signal generating circuit.

In a third aspect, an embodiment of the present disclosure further provides a splicing display device, including the foregoing starting signal providing module.

Optionally, the splicing display device according to at least one embodiment of the present disclosure further includes a main board and a display driving IC; the detection circuit included by the starting signal providing module is arranged on the mainboard; the enabling circuit is electrically connected to the starting signal terminal:

the detection circuit is further configured to provide an enabling control signal to the display driving circuit;

the display driving integrated circuit is configured to provide a starting signal to the starting signal terminal when receiving the enabling control signal.

Optionally, the splicing display device further includes at least one column of display panels in N rows; the spliced display device comprises N display driving integrated circuits: n is a positive integer; the number of the display panels included in the splicing display device is at least two;

the display driving integrated circuit corresponds to one row of the display panel;

the display driving integrated circuit is electrically connected to the corresponding row display panel through the starting signal terminal and is configured to provide a corresponding starting signal for the scan driving circuit in the corresponding row display panel through the starting signal terminal when the enabling control signal is received;

the display panel includes a gate line extending in a row direction and a power voltage line extending in a column direction.

Optionally, the splicing display device according to at least one embodiment of the present disclosure further includes N flexible circuit boards; the flexible circuit board corresponds to the display driving integrated circuit; the detection circuit comprises an enabling control signal output terminal:

the enabling control signal output terminal of the detection circuit is electrically connected to the corresponding display driving integrated circuit through the flexible circuit board, and the detection circuit provides the enabling control signal for the corresponding display driving integrated circuit through the flexible circuit board.

Optionally, the splicing display device further includes at least two display panels; the spliced display device comprises the display driving integrated circuit:

the display driving integrated circuit is electrically connected to the at least two display panels through the starting signal terminal and is configured to provide corresponding starting signals for scan driving circuits in the at least two display panels through the starting signal terminal when the enabling control signals are received.

Optionally, the splicing display device according to at least one embodiment of the present disclosure further includes a flexible circuit board; the detection circuit comprises an enabling control signal output terminal;

the enabling control signal output terminal of the detection circuit is electrically connected to the display driving integrated circuit through the flexible circuit board, and the detection circuit provides an enabling control signal for the enabling circuit through the flexible circuit board.

The module and the method for providing the starting signal and the splicing display device can ensure that at least two display panels can synchronously display, and image quality loss caused by different display panels can be avoided.

DETAILED DESCRIPTION

Figure 1:
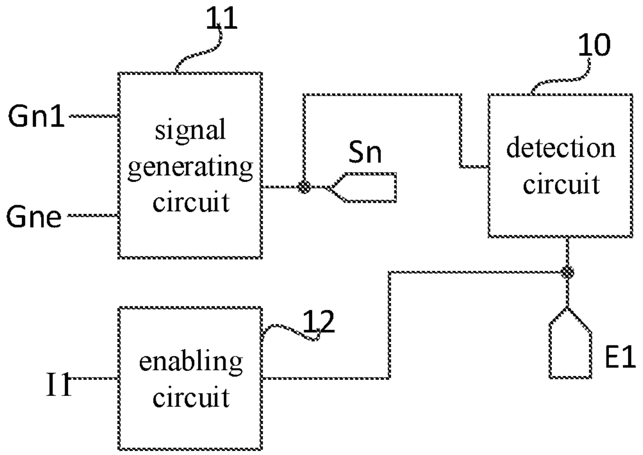
FIG. 1 is a block diagram of a starting signal providing module according to at least one embodiment of the disclosure.

The technical solutions in the embodiments of the present disclosure will be described clearly and completely with reference to the drawings in the embodiments of the present disclosure, and it is obvious that the embodiments described are only some embodiments of the present disclosure, rather than all embodiments. All other embodiments, which can be derived by a person skilled in the art from the embodiments disclosed herein without making any creative effort, shall fall within the protection scope of the present disclosure.

The transistors used in all embodiments of the present disclosure may be transistors, thin film transistors, or field effect transistors or other devices with the same characteristics. In the embodiments of the present disclosure, to distinguish two poles of a transistor except for a control pole, one pole is referred to as a first pole, and the other pole is referred to as a second pole.

In practical operation, when the transistor is a triode, the control electrode may be a base electrode, the first electrode may be a collector electrode, and the second electrode may be an emitter electrode: alternatively, the control electrode may be a base electrode, the first electrode may be an emitter electrode, and the second electrode may be a collector electrode.

In practical operation, when the transistor is a thin film transistor or a field effect transistor, the control electrode may be a gate electrode, the first electrode may be a drain electrode, and the second electrode may be a source electrode: alternatively, the control electrode may be a gate electrode, the first electrode may be a source electrode, and the second electrode may be a drain electrode.

The starting signal providing module is applied to a splicing display device, and the splicing display device comprises at least two display panels; the display panel comprises a scan driving circuit; the scan driving circuit comprises a plurality of cascaded scan driving units; the starting signal providing module comprises a detection circuit, a plurality of signal generating circuits and a plurality of enabling circuits; the signal generating circuit corresponds to the display panel, and the enabling circuit corresponds to the display panel and the signal generating circuit respectively:

the signal generating circuit is configured to generate and provide a feedback signal to the detecting circuit when a last-stage scan driving signal output terminal of a scan driving circuit in a corresponding display panel outputs a valid scan driving signal;

the detection circuit is electrically connected to the plurality of signal generating circuits and is configured to provide an enabling control signal to enabling circuits corresponding to at least two signal generating circuits according to the feedback signals from at least two signal generating circuits;

the enabling circuit is configured to control a starting signal to be supplied to a scan driving circuit included in a corresponding display panel upon receiving the enabling control signal.

When the starting signal providing module disclosed by the embodiment of the disclosure works, when the last-stage of scan driving signal output terminal of the scan driving circuit in the corresponding display panel outputs a valid scan driving signal, the signal generating circuit generates and provides a feedback signal for the detection circuit; the detection circuit provides enabling control signals to enabling circuits corresponding to at least two signal generating circuits according to the feedback signals from the at least two signal generating circuits: when the enabling circuit receives the enabling control signal, the enabling circuit controls the scan driving circuit included in the corresponding display panel to provide a starting signal so as to ensure that at least two display panels included in the splicing display device can synchronously display, and image quality loss caused by different display panels cannot occur.

Optionally, the n-th signal generating circuit may correspond to an n-th display panel included in the splicing display device, and the n-th enabling circuit may correspond to the n-th display panel and the n-th signal generating circuit, respectively: n is a positive integer.

In at least one embodiment of the present disclosure, for example, when the splicing display device includes nine display panels, and at least two of the display panels need to be synchronously displayed, the detection circuit, when receiving the feedback signals from the at least two display panels, may respectively provide the scan signals for the scan driving circuits in the corresponding display panels through the enabling circuits corresponding to the at least two display panels, so as to implement the synchronous display of the at least two display panels.

In at least one embodiment of the present disclosure, for example, when the splicing display device includes nine display panels and all the nine display panels need to display synchronously, the detection circuit can provide scanning signals for the scan driving circuits in the corresponding display panels respectively through the enabling circuits corresponding to the nine display panels when receiving feedback signals from the nine display panels, so as to implement synchronous display of the nine display panels.

Optionally, the scan driving circuit may be a gate driving circuit or a light-emitting control signal generating circuit, but not limited thereto, and the scan driving circuit may also be another circuit that generates a corresponding scan driving signal.

Optionally, the signal generating circuit may include an indication signal output terminal, and the signal generating circuit is electrically connected to the first-stage scan driving signal output terminal of the scan driving circuit in the corresponding display panel and the last-stage scan driving signal output terminal of the scan driving circuit in the corresponding display panel, respectively, and is configured to control to output a first voltage signal through the corresponding indication signal output terminal when the first-stage scan driving signal output terminal outputs a valid scan driving signal, and control to output a second voltage signal through the corresponding indication signal output terminal when the last-stage scan driving signal output terminal outputs a valid scan driving signal; the feedback signal is the second voltage signal;

the detection circuit comprises enabling control signal output terminals, the detection circuit is electrically connected to the indicating signal output terminals of the signal generating circuits, and when the indicating signal output terminals of at least two signal generating circuits output second voltage signals, enabling control signals are provided for the enabling circuits corresponding to the at least two signal generating circuits through the enabling control signal output terminals;

the enabling circuit is electrically connected to the starting signal terminal and is configured to control the starting signal to be provided for a first-stage scan driving unit in the scan driving circuit included in the corresponding display panel through the starting signal terminal when the enabling control signal is received.

When the starting signal providing module of at least one embodiment of the disclosure is in operation, when an output terminal of a last-stage scan driving signal in scan driving circuits of at least two display panels included in the splicing display device outputs a valid scan driving signal, the signal generating circuits corresponding to the at least two display panels provide a second voltage signal to the detection circuit, and the detection circuit provides an enabling control signal to enabling circuits corresponding to the at least two display panels so as to control the enabling circuits to provide the starting signal to first-stage scan driving units of the scan driving circuits included in the display panels corresponding to the enabling circuits, so as to ensure that the at least two display panels included in the splicing display device can be synchronously displayed, and image quality loss caused by different display panels does not occur;

and when the first-stage scan driving signal output terminal of the scan driving circuit in the corresponding display panel outputs a valid scan driving signal, controlling to output a first voltage signal through the corresponding indicating signal output terminal so as to reset the signal output by the corresponding indicating signal output terminal, so that the synchronous display of different display panels in the next display period cannot be influenced.

In an embodiment of the present disclosure, the splicing display device comprises at least two display panels tiled together.

By adopting the module for providing the starting signal, the spliced display device can be controlled to start scanning next time by all the display panels included in the spliced display device after the scan driving circuits in at least two display panels included in the spliced display device complete scanning, and synchronous display can be ensured.

When the starting signal providing module works, the output state of the scan driving circuit is judged and synchronously processed before each frame of display picture, and display abnormity caused by scan driving time sequence dislocation is eliminated.

In at least one embodiment of the present disclosure, when the first voltage signal is a high voltage signal, the second voltage signal may be a low voltage signal; alternatively, when the first voltage signal is a low voltage signal, the second voltage signal may be a high voltage signal.

In at least one embodiment of the present disclosure, the first-stage scan driving signal output terminal may be a scan driving signal output terminal of a first-stage scan driving unit in the scan driving circuit, and the last-stage scan driving signal output terminal may be a scan driving signal output terminal of a last-stage scan driving unit in the scan driving circuit.

In at least one embodiment of the present disclosure, the valid scan driving signal refers to a scan driving signal capable of turning on a transistor included in a pixel circuit in a display panel and connected to the scan driving signal; for example, when the transistor is an n-type transistor, the active scan driving signal may be a high voltage signal; when the transistor is a p-type transistor, the active scan driving signal may be a low voltage signal.

Optionally, the display panel may include a plurality of rows and a plurality of columns of pixel circuits; the transistor can be a data writing transistor, but is not limited to the above: at least one embodiment of the pixel circuit may include the data writing transistor, the driving transistor, and the light emitting element; the gate electrode of the data writing transistor is electrically connected to the corresponding row gate line, the first pole of the data writing transistor is electrically connected to the corresponding column data line, and the second pole of the data writing transistor is electrically connected to the gate electrode of the driving transistor: a first pole of the driving transistor may be electrically connected to a power voltage line, and a second pole of the driving transistor may be electrically connected to the light emitting element. The above description is only for illustrating the structure of the pixel circuit, and is not intended to limit the structure of the pixel circuit.

The operation of the starting signal providing module according to at least one embodiment of the present disclosure is described below by the signal transmission between the detection circuit and one of the plurality of signal generating circuits and one of the plurality of enabling circuits.

As shown in FIG. 1, the starting signal providing module according to at least one embodiment of the present disclosure may include a detection circuit 10, a signal generating circuit 11, and an enabling circuit 12; the signal generating circuit 11 and the enabling circuit 12 correspond to an n-th display panel in the splicing display device, wherein n is a positive integer;

- the signal generating circuit 11 includes an n-th pointing signal output terminal Sn, the signal generating circuit 11 being electrically connected to a first-stage scan driving signal output terminal Gn1 of the scan driving circuit in the n-th display panel and a last-stage scan driving signal output terminal Gne of the scan driving circuit in the n-th display panel, respectively, for controlling a high voltage signal to be output through Sn when Gn1 outputs a low voltage signal, and controlling a low voltage signal to be output through Sn when Gne outputs a low voltage signal;
- the detection circuit 10 comprises an enabling control signal output terminal E1, the detection circuit 10 is electrically connected to Sn, and the detection circuit 10 is configured to provide an enabling control signal to the enabling circuit 12 through E1 when the indication signal output terminals of at least two signal generating circuits output low-voltage signals;
- the enabling circuit 12 is electrically connected to the enabling control signal output terminal E1 and the start voltage terminal I1, respectively, and is configured to control the supply of the starting signal to the first-stage scan driving unit in the n-th display panel through the start voltage terminal I1 after receiving the enabling control signal.

In at least one embodiment shown in FIG. 1, the first voltage signal is a high voltage signal, the second voltage signal is a low voltage signal, and the valid scan driving signal is a low voltage signal, but not limited thereto.

In at least one embodiment of the present disclosure, the signal generating circuit may include a first generating circuit and a second generating circuit:

- the first generating circuit is and electrically connected to a first voltage terminal, the corresponding indicating signal output terminal and a first-stage scan driving signal output terminal of the corresponding scan driving circuit in the display panel, and is configured to control the communication between the corresponding indicating signal output terminal and the first voltage terminal when the first-stage scan driving signal output terminal of the corresponding scan driving circuit in the display panel outputs a valid scan driving signal; the first voltage terminal is configured to provide the first voltage signal;
- the second generating circuit is electrically connected to a second voltage terminal, the corresponding indicating signal output terminal and the last-stage scan driving signal output terminal of the corresponding scan driving circuit in the display panel, and is configured to control the communication between the corresponding indicating signal output terminal and the second voltage terminal when the last-stage scan driving signal output terminal of the corresponding scan driving circuit in the display panel outputs a valid scan driving signal; the second voltage terminal is configured to provide a second voltage signal.

In a specific implementation, the signal generating circuit may include a first generating circuit and a second generating circuit, the first generating circuit controls the corresponding indication signal output terminal to output a first voltage signal when the first-stage scan driving signal output terminal outputs a valid scan driving signal, and the second generating circuit is configured to control the corresponding indication signal output terminal to output a second voltage signal when the last-stage scan driving signal output terminal outputs a valid scan driving signal.

Figure 2:
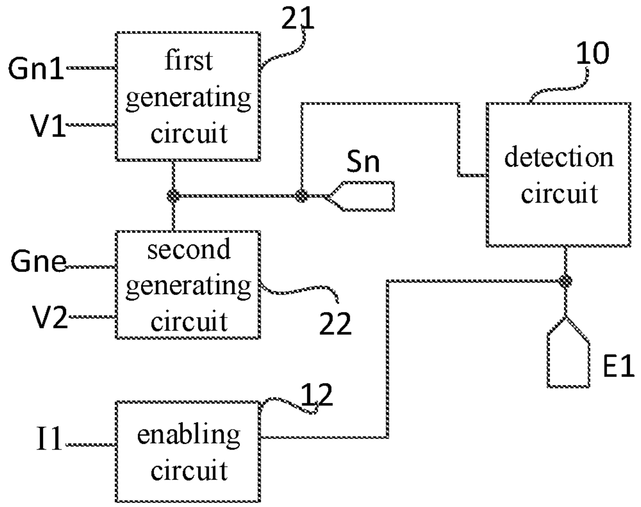
FIG. 2 is a block diagram of a starting signal providing module according to at least one embodiment of the disclosure.

As shown in FIG. 2, the signal generating circuit may include a first generating circuit 21 and a second generating circuit 22; the signal generating circuit corresponds to an n-th display panel in the splicing display device, and n is a positive integer:

- the first generating circuit 21 is electrically connected to a high voltage terminal, an n-th indication signal output terminal Sn and a first-stage scan driving signal output terminal Gn1 of a scan driving circuit in an n-th display panel, and is configured to control the communication between the n-th indication signal output terminal Sn and the high voltage terminal when the first-stage scan driving signal output terminal Gn1 outputs a low voltage signal; the high voltage terminal is configured to provide a high voltage signal V1;
- the second generating circuit 22 is electrically connected to a low voltage terminal, the n-th indication signal output terminal Sn and the last-stage scan driving signal output terminal Gne of the scan driving circuit in the n-th display panel, respectively, and is configured to control the communication between the corresponding indication signal output terminal and the low voltage terminal when the last-stage scan driving signal output terminal Gne outputs a low voltage signal; the low voltage terminal is configured to provide a low voltage signal V2.

Optionally, the first generating circuit includes a first transistor, and the second generating circuit includes a second transistor:

a control electrode of the first transistor is electrically connected to the first-stage scan driving signal output terminal of a scan driving circuit in the corresponding display panel, a first electrode of the first transistor is electrically connected to the first voltage terminal, and a second electrode of the first transistor is electrically connected to the corresponding indication signal output terminal;

and the control electrode of the second transistor is electrically connected to the last-stage of scan driving signal output terminal of the scan driving circuit in the corresponding display panel, the first electrode of the second transistor is electrically connected to the second voltage terminal, and the second electrode of the second transistor is electrically connected to the corresponding indicating signal output terminal.

Figure 3:
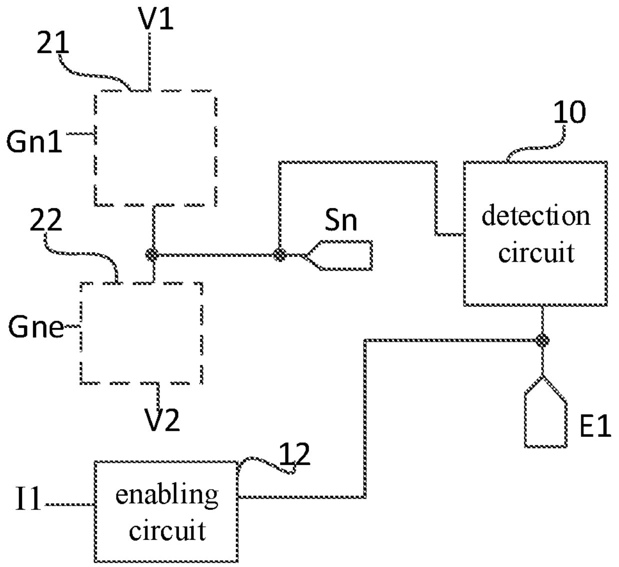
FIG. 3 is a block diagram of a starting signal providing module according to at least one embodiment of the disclosure.

As shown in FIG. 3, based on at least one embodiment of the starting signal providing module shown in FIG. 2, the first generating circuit 21 may include a first transistor T1, and the second generating circuit 21 may include a second transistor T2;

the gate electrode of the first transistor T1 is electrically connected to the first-stage scan driving signal output terminal Gn1, the source electrode of the first transistor T1 is electrically connected to the high voltage terminal, and the drain electrode of the first transistor T1 is electrically connected to the n-th indication signal output terminal Sn; the high voltage terminal is configured to provide a high voltage signal V1;

a gate electrode of the second transistor T2 is electrically connected to the last-stage scan driving signal output terminal Gne, a source electrode of the second transistor T2 is electrically connected to the low voltage terminal, and a drain electrode of the second transistor T2 is electrically connected to the n-th indication signal output terminal Sn; the low voltage terminal is configured to provide a low voltage signal V2.

In at least one embodiment shown in FIGS. 3, T1 and T2 are both p-type tfts, but not limited thereto.

When at least one embodiment of the starting signal providing module shown in FIG. 3 is in operation, when Gn1 provides a low voltage signal, Gne provides a high voltage signal, T1 is turned on, and T2 is turned off, so that Sn outputs a high voltage signal; when Gne provides a low voltage signal, Gn1 provides a high voltage signal, T1 turns off, and T2 turns on, so that Sn outputs a low voltage signal.

Optionally, the enabling circuit includes a third transistor:

a control electrode of the third transistor is electrically connected to the enabling control signal output terminal, a first electrode of the third transistor is electrically connected to the starting signal terminal, and a second electrode of the third transistor is electrically connected to an input terminal of a first-stage scan driving unit in a scan driving circuit included in the corresponding display panel;

the starting signal terminal is configured to provide a starting signal.

Figure 4:
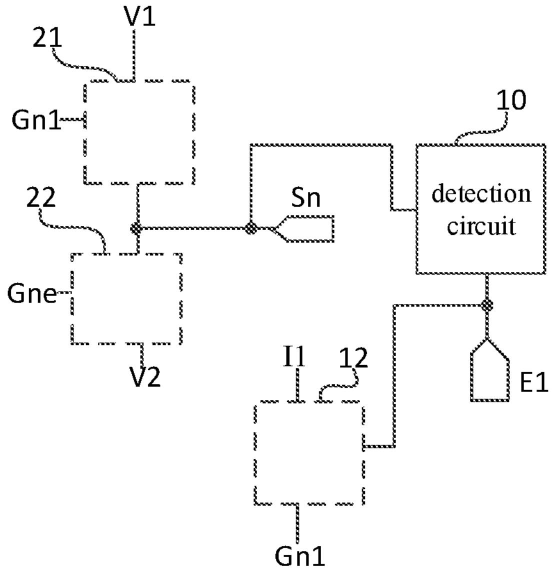
FIG. 4 is a circuit diagram of a starting signal providing module according to at least one embodiment of the disclosure.

As shown in FIG. 4, based on at least one embodiment of the starting signal providing module shown in FIG. 3, the enabling circuit 12 includes a third transistor T3;

the gate of T3 is electrically connected to the enabling control signal output terminal E1, the source of T3 is electrically connected to the starting signal terminal I1, and the drain of T3 is electrically connected to the input terminal of the first-stage scan driving unit Gn1 in the scan driving circuit included in the n-th display panel.

In at least one embodiment shown in FIG. 4, T3 is a p-type thin film transistor, but not limited thereto.

In operation of at least one embodiment of the starting signal providing module shown in FIG. 4 of the present disclosure, when the indication signal output terminals included in at least two signal generating circuits both output low voltage signals, the detection circuit 10 provides an enabling control signal (in at least one embodiment shown in FIG. 4, the enabling control signal may be a low voltage signal) to the gate of T3 through E1, so that T3 is turned on, thereby enabling communication between the input terminals of I1 and Gn1, and providing the starting signal to the input terminal of Gn1 through I1.

When the starting signal providing module according to at least one embodiment of the present disclosure is in operation, when the detection circuit 10 determines that the indication signal output terminals included in the at least two signal generating circuits all output low voltage signals, that is, when the last scan driving unit in the at least two display panels included in the splicing display device all outputs valid scan driving signals, the detection circuit 10 (the detection circuit 10 may be disposed on a motherboard included in the splicing display device) feeds back an enabling control signal to the gate of T3 and the display driving integrated circuit included in the splicing display device, so as to control T3 to be turned on, and after receiving the enabling control signal, the display driving integrated circuit provides a starting signal to the starting signal terminal I1, so as to provide the starting signal to the input terminal of the first scan driving unit in the scan driving circuits included in the at least two display panels in the splicing display device, so that at least two display panels are scanned.

In at least one embodiment of the present disclosure, the detection circuit may include an OR-gate and an enabling control signal generating circuit; the first voltage signal is a high voltage signal, and the second voltage signal is a low voltage signal;

a plurality of input terminals of the OR-gate are respectively electrically connected to the indicating signal output terminals of the plurality of signal generating circuits, and the output terminal of the OR-gate is electrically connected to the enabling control signal generating circuit;

the enabling control signal generating circuit is electrically connected to the enabling control signal output terminal and is configured to control the enabling control signal to be output through the enabling control signal output terminal when the output terminal of the OR-gate outputs a low-voltage signal.

In a specific implementation, the detection circuit may include an OR-gate and an enabling control signal generating circuit, the enabling control signal generating circuit outputs an enabling control signal when the OR-gate outputs a low voltage signal, and the detection circuit may be disposed on a main board in the splicing display device.

Figure 5:
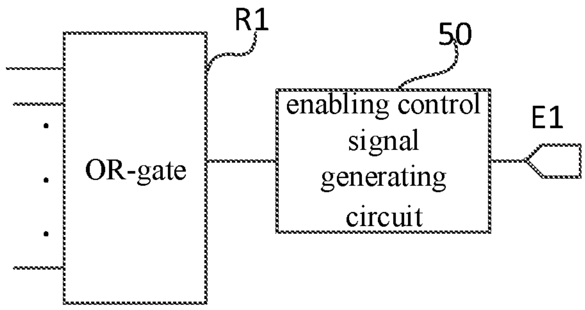
FIG. 5 is a block diagram of a detection circuit in a starting signal providing module according to at least one embodiment of the present disclosure.

As shown in FIG. 5, in at least one embodiment of the starting signal providing module of the present disclosure, the detecting circuit may include an OR-gate RI and an enabling control signal generating circuit 50; the first voltage signal is a high voltage signal, and the second voltage signal is a low voltage signal;

a plurality of input terminals of the OR-gate RI are electrically connected to the indication signal output terminals included in the plurality of signal generating circuits, respectively, and an output terminal of the OR-gate is electrically connected to the enabling control signal generating circuit 50;

the enabling control signal generating circuit 50 is electrically connected to the enabling control signal output terminal E1, and is configured to control the enabling control signal to be output through the enabling control signal output terminal E1 when the output terminal of the OR-gate RI outputs a low voltage signal.

When at least one embodiment of the detection circuit shown in FIG. 5 of the present disclosure is in operation, when all of the indication signal output terminals included in the plurality of signal generating circuits output low voltage signals, RI outputs low voltage signals, at this time, the enabling control signal generating circuit 50 outputs enabling control signals, and when at least one of the indication signal output terminals outputs high voltage signals, RI outputs high voltage signals.

Optionally, the signal generating circuit is disposed in a peripheral area of the corresponding display panel.

In at least one embodiment of the present disclosure, the peripheral region is a region of the display panel except for an effective display region, and the peripheral region may be disposed around the effective display region.

Figure 6:
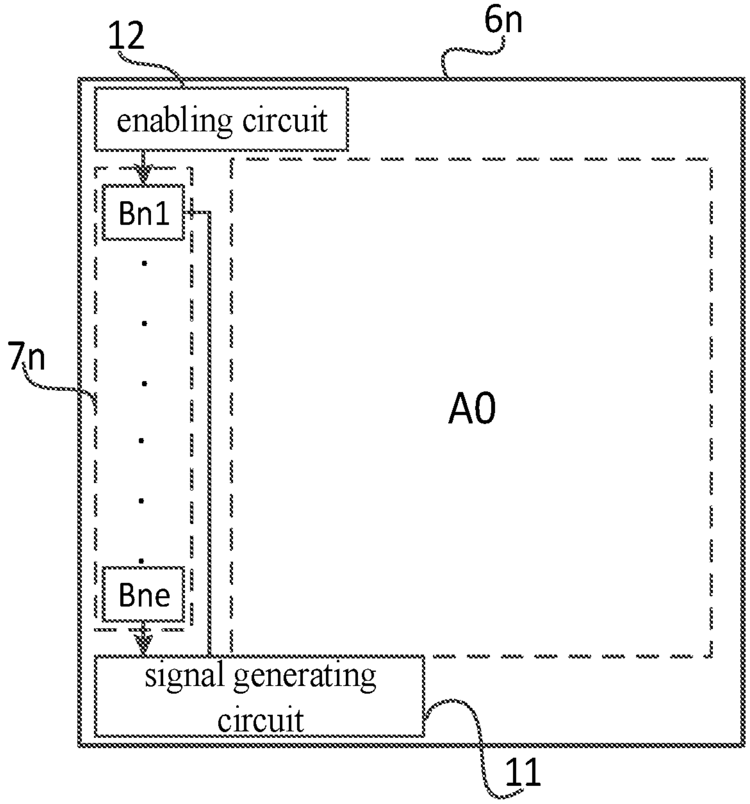
FIG. 6 is a schematic diagram of the signal generating circuit 11 and the enabling circuit 12 provided in the peripheral area of the n-th display panel.

As shown in FIG. 6, reference numeral 6*n* is an n-th display panel included in the splicing display device, a0 is an effective display area of the n-th display panel 6*n*, and an area other than a0 on the n-th display panel 6*n* is a peripheral area:

the signal generating circuit 11 and the enabling circuit 12 in the starting signal providing module according to at least one embodiment of the present disclosure may be disposed in a peripheral region of the n-th display panel 6 *n;* in FIG. 6, reference numeral 7*n* denotes a scan driving circuit included in the n-th display panel 6*n*, reference numeral Bn1 denotes a first-stage gate driving unit included in the scan driving circuit 7*n*, and reference numeral Bne denotes a last-stage gate driving unit included in the scan driving circuit 7 *n;* the signal generating circuit 11 is electrically connected to the gate driving signal output terminal of the first-stage gate driving unit Bn1 included in the scan driving circuit 7*n* and the gate driving signal output terminal of the last-stage gate driving unit Bne included in the scan driving circuit 7 *n;* the enabling circuit 12 is electrically connected to an input terminal of the first-stage gate driving unit Bn1 included in the scan driving circuit 7 *n.*

Optionally, the signal generating circuit includes an indication signal output terminal, and the signal generating circuit is electrically connected to a last-stage scan driving signal output terminal of a corresponding scan driving circuit in the display panel, and is configured to control, when the last-stage scan driving signal output terminal outputs a valid scan driving signal, to output a third voltage signal to the detecting circuit through the corresponding indication signal output terminal; the feedback signal is the third voltage signal;

the detection circuit comprises enabling control signal output terminals, the detection circuit is electrically connected to the indicating signal output terminals of the signal generating circuits, and is configured to provide enabling control signals for enabling circuits corresponding to the at least two signal generating circuits through the enabling control signal output terminals when the indicating signal output terminals of the at least two signal generating circuits output third voltage signals;

the enabling circuit is electrically connected to the starting signal terminal and the indicating signal output terminal, and is configured to control the starting signal to be provided for a first-stage scan driving unit in a scan driving circuit included in the corresponding display panel through the starting signal terminal and providing a fourth voltage signal for the indicating signal output terminal of the corresponding signal generating circuit when the enabling control signal is received.

In at least one embodiment of the present disclosure, the third voltage signal is different from the fourth voltage signal, for example, the third voltage signal may be a high voltage signal, and the fourth voltage signal may be a low voltage signal; alternatively, the third voltage signal may be a low voltage signal, and the fourth voltage signal may be a high voltage signal.

When the starting signal providing module of at least one embodiment of the disclosure is in operation, when the last-stage of the scan driving signal output terminal of the scan driving circuit of at least two display panels included in the splicing display device outputs a valid scan driving signal, the signal generating circuit corresponding to the at least two display panels provides a fourth voltage signal to the detecting circuit, the detecting circuit provides an enabling control signal to the enabling circuit corresponding to the at least two display panels to control the enabling circuit to provide the starting signal to the first-stage of the scan driving circuit included in the display panel corresponding to the enabling circuit, so as to ensure that the at least two display panels included in the splicing display device can display synchronously without image quality loss caused by different display panels, and the enabling circuit provides the fourth voltage signal to the indication signal output terminal of the corresponding signal generating circuit, the signal provided by the indicating signal output terminal is reset so as not to influence the synchronous display control of the next display period. The method for providing the starting signal according to the embodiment of the present disclosure is applied to the above starting signal providing module, and the method for providing the starting signal includes:

when the last-stage of scan driving signal output terminal of the scan driving circuit in the corresponding display panel outputs a valid scan driving signal, the signal generating circuit generates and provides a feedback signal for the detection circuit;

the detection circuit provides enabling control signals to enabling circuits corresponding to at least two signal generating circuits according to the feedback signals from the at least two signal generating circuits;

and when the enabling circuit receives the enabling control signal, controlling to provide a starting signal to a scan driving circuit included in the corresponding display panel.

In the starting signal providing method according to the embodiment of the present disclosure, when the last-stage of scan driving signal output terminal of the scan driving circuit in the corresponding display panel outputs a valid scan driving signal, the signal generating circuit generates and provides a feedback signal to the detecting circuit; the detection circuit provides enabling control signals to enabling circuits corresponding to at least two signal generating circuits according to the feedback signals from the at least two signal generating circuits: when the enabling circuit receives the enabling control signal, the enabling circuit controls the scan driving circuit included in the corresponding display panel to provide a starting signal so as to ensure that at least two display panels included in the splicing display device can synchronously display, and image quality loss caused by different display panels cannot occur.

Optionally, the method for providing a starting signal according to at least one embodiment of the present disclosure includes:

when the first-stage scan driving signal output terminal of the corresponding scan driving circuit in the display panel outputs a valid scan driving signal, the signal generating circuit controls to output a first voltage signal through the corresponding indication signal output terminal, and when the last-stage scan driving signal output terminal of the corresponding scan driving circuit in the display panel outputs a valid scan driving signal, the signal generating circuit controls to output a second voltage signal through the corresponding indication signal output terminal; the feedback signal is the second voltage signal;

when the indicating signal output terminals of at least two signal generating circuits output second voltage signals, the detection circuit provides enabling control signals for enabling circuits corresponding to the at least two signal generating circuits through the enabling control signal output terminals;

when the enabling circuit receives the enabling control signal, the enabling circuit controls to provide a starting signal to a first-stage scan driving unit in a scan driving circuit included in the corresponding display panel through the starting signal terminal.

In the starting signal providing method according to at least one embodiment of the present disclosure, when an output terminal of a last scan driving signal in scan driving circuits of at least two display panels included in the splicing display device outputs a valid scan driving signal, the signal generating circuit corresponding to the at least two display panels provides a second voltage signal to the detecting circuit, and the detecting circuit provides an enabling control signal to the enabling circuit corresponding to the at least two display panels to control the enabling circuit to provide a starting signal to a first-stage scan driving unit of the scan driving circuit included in the display panel corresponding to the enabling circuit, so as to ensure that the at least two display panels included in the splicing display device can be displayed synchronously, and image quality loss caused by different display panels does not occur;

and when the first-stage scan driving signal output terminal of the scan driving circuit in the corresponding display panel outputs a valid scan driving signal, controlling to output a first voltage signal through the corresponding indicating signal output terminal so as to reset the signal output by the corresponding indicating signal output terminal, so that the synchronous display of different display panels in the next display period cannot be influenced.

Optionally, the method for providing a starting signal according to at least one embodiment of the present disclosure includes:

when the last-stage of scan driving signal output terminal of the corresponding scan driving circuit in the display panel outputs a valid scan driving signal, the signal generating circuit controls to output a third voltage signal to the detection circuit through the corresponding indicating signal output terminal; the feedback signal is the third voltage signal;

when the indicating signal output terminals of at least two signal generating circuits output third voltage signals, the detection circuit provides enabling control signals for enabling circuits corresponding to the at least two signal generating circuits;

when the enabling circuit receives the enabling control signal, the enabling circuit controls the starting signal to be provided for a first-stage scan driving unit in a scan driving circuit included in the corresponding display panel through the starting signal terminal so as to ensure that at least two display panels included in the splicing display device can synchronously display, and image quality loss caused by different display panels cannot occur; and the enabling circuit provides a fourth voltage signal to the indication signal output terminal of the corresponding signal generating circuit so as to reset the signal provided by the indication signal output terminal, so that the synchronous display control of the next display period is not influenced.

The splicing display device comprises the starting signal providing module.

In at least one embodiment of the present disclosure, the splicing display device may further include a main board and a display driving integrated circuit; the detection circuit included in the starting signal providing module can be arranged on the mainboard; the enabling circuit is electrically connected to the starting signal terminal The detection circuit is further configured to provide an enabling control signal to the display driving circuit;

the display driving integrated circuit is configured to provide a starting signal to the starting signal terminal when receiving the enabling control signal.

In specific implementation, the detection circuit adopted by the starting signal providing module can be arranged on a main board of the splicing display device, and the display driving integrated circuit provides the starting signal to the starting signal terminal when receiving the enabling control signal.

Optionally, the splicing display device may further include at least one column of display panels in N rows; the spliced display device comprises N display driving integrated circuits: n is a positive integer; the number of the display panels included in the splicing display device is at least two:

the display driving integrated circuit corresponds to one row of the display panel;

the display driving integrated circuit comprises a starting signal terminal, is electrically connected to the corresponding line display panel through the starting signal terminal and is configured to provide a corresponding starting signal for the scan driving circuit in the corresponding line display panel through the starting signal terminal when receiving the enabling control signal;

the display panel includes a gate line extending in a row direction and a power voltage line extending in a column direction.

In at least one embodiment of the present disclosure, when the splicing display device includes N rows of display panels, only N display driving ICs may be used, that is, one display panel in one row shares one display driving IC.

In a related splicing display device (the splicing display device may include a display panel that is an AMOLED (active matrix organic light emitting diode) display product), one display panel corresponds to one DDIC (display driver integrated circuit) and one FPC (flexible printed circuit), which is very costly. Based on this, in at least one embodiment of the present disclosure, a row of display panels may be disposed to share a display driving integrated circuit and a flexible circuit board, and the display driving integrated circuit is electrically connected to the main board through the flexible circuit board.

In the splicing display device according to at least one embodiment of the present disclosure, each display panel is usually a middle-sized or small-sized display panel, for example, when the splicing display device according to at least one embodiment of the present disclosure includes 3 rows and 3 columns of display panels, the same row of display panels may share one display driving IC. The display panel may include gate lines extending in a first direction and power voltage lines extending in a second direction, and the data lines included in the display panel may also extend in the second direction (the first direction intersects with the second direction), so that the same row of display panels included in the splicing display device may be arranged in the first direction.

When the display panel included in the splicing display device is an AMOLED display panel, because the AMOLED display panel adopts a current-type driving manner, the current flowing through the organic light emitting diode included in the AMOLED display panel is related to the voltage value of the power voltage signal provided by the power voltage line, and at a high luminance, the high current will generate a large voltage drop in the extending direction of the power voltage line, so if the display panels in the same column share one DDIC, the potential difference of the power voltage signals received by different display panels in the same column will be large, which will result in a large display luminance difference, and affect the display effect.

In at least one embodiment of the present disclosure, the DDIC does not supply the display panel with the power voltage signal, but the line supplying the power voltage signal is supplied to the display panel through the DDCI.

Optionally, the DDIC provides a data voltage for the display panel.

The splicing display device according to at least one embodiment of the present disclosure may further include N flexible circuit boards; the flexible circuit board corresponds to the display driving integrated circuit; the detection circuit comprises an enabling control signal terminal;

the enabling control signal output terminal of the detection circuit is electrically connected to the corresponding display driving integrated circuit through the flexible circuit board, and the detection circuit provides the enabling control signal for the corresponding display driving integrated circuit through the flexible circuit board.

In a specific implementation, a peripheral circuit of the display driving IC may be disposed on the flexible circuit board, and the motherboard may be electrically connected to the flexible circuit board through a communication interface, and the flexible circuit board may receive a signal from the motherboard through the communication interface and transmit the signal to the corresponding display driving IC.

Figure 7:
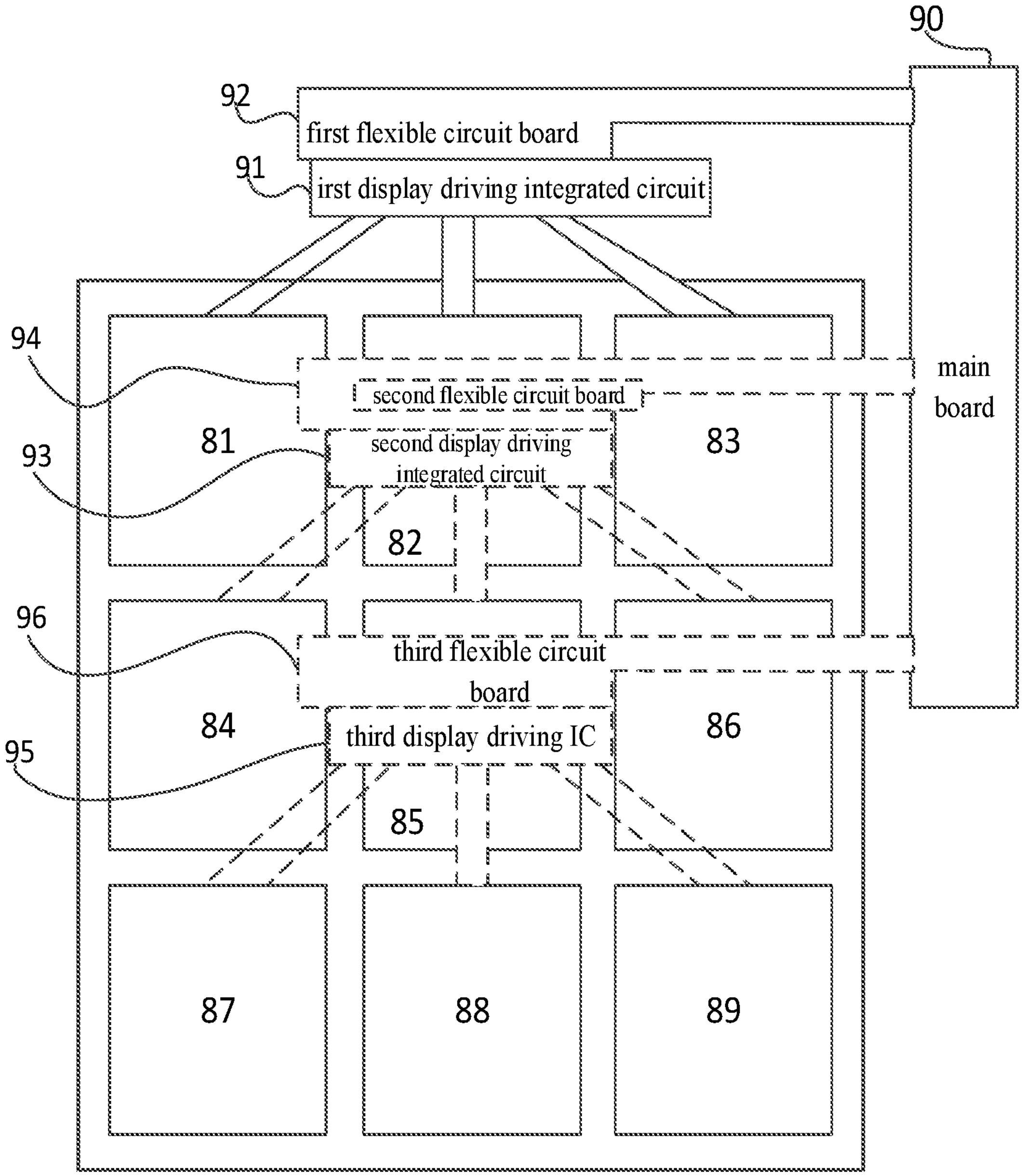
FIG. 7 is a schematic structural diagram of a splicing display device according to at least one embodiment of the present disclosure.

As shown in FIG. 7, the splicing display device according to at least one embodiment of the present disclosure may include a first row and first column display panel 81, a first row and second column display panel 82, a first row and third column display panel 83, a second row and first column display panel 84, a second row and second column display panel 85, a second row and third column display panel 86, a third row and first column display panel 87, a third row and second column display panel 88, a third row and third column display panel 89, a main board 90, a first display driving integrated circuit 91, a first flexible circuit board 92, a second display driving integrated circuit 93, a second flexible circuit board 94, a third display driving integrated circuit 95, and a third flexible circuit board 96;

the main board 90 is electrically connected to the first display driving integrated circuit 91 through the first flexible circuit board 92, and the first display driving integrated circuit 91 is configured to provide a starting signal for the first row and first column display panel 81, the first row and second column display panel 82, and the first row and third column display panel 83 when receiving the enabling control signal;

the main board 90 is electrically connected to a second display driving integrated circuit 93 through a second flexible circuit board 94, and the second display driving integrated circuit 93 is configured to provide a starting signal for the second row and first column display panel 84, the second row and second column display panel 85, and the second row and third column display panel 86 when receiving the enabling control signal;

the main board 90 is electrically connected to a third display driving IC 95 through a third flexible circuit board 96, and the third display driving IC 95 is configured to provide a starting signal for the third row and first column display panel 87, the third row and second column display panel 88, and the third row and third column display panel 89 when receiving the enabling control signal.

In at least one embodiment shown in FIG. 7, the first display driving IC 91 is further configured to provide the corresponding data voltages to the first row and first column display panel 81, the first row and second column display panel 82, and the first row and third column display panel 83, respectively, and provide the power voltage signals to the first row and first column display panel 81, the first row and second column display panel 82, and the first row and third column display panel 83:

the second display driving integrated circuit 93 may be further configured to provide corresponding data voltages to the second row and first column display panel 84, the second row and second column display panel 85, and the second row and third column display panel 86, respectively, and provide power voltage signals to the second row and first column display panel 84, the second row and second column display panel 85, and the second row and third column display panel 86;

the third display driving IC 95 can be further configured to provide corresponding data voltages to the third row and first column display panel 87, the third row and second column display panel 88 and the third row and third column display panel 89, respectively, and provide power voltage signals to the third row and first column display panel 87, the third row and second column display panel 88 and the third row and third column display panel 89.

In at least one embodiment shown in FIG. 7, a second display driving IC 93 and a second flexible circuit board 94 may be attached to a surface of the first row of display panels that is not used for display, and a third display driving IC 95 and a third flexible circuit board 96 may be disposed on a surface of the second row of display panels that is not used for display.

In at least one embodiment shown in FIG. 7, the first direction may be a horizontal direction and the second direction may be a vertical direction.

Optionally, the splicing display device according to at least one embodiment of the present disclosure may further include at least two display panels; the spliced display device comprises the display driving integrated circuit;

the display driving integrated circuit comprises a starting signal terminal, is electrically connected to the at least two display panels through the starting signal terminal and is configured to provide corresponding starting signals for scan driving circuits in the at least two display panels through the starting signal terminal when receiving the enabling control signals.

In at least one embodiment of the present disclosure, the splicing display device according to at least one embodiment of the present disclosure may also include only one DDIC, and the DDIC respectively provides starting signals for at least two display panels included in the splicing display device.

In specific implementation, the splicing display device according to at least one embodiment of the present disclosure may further include a flexible circuit board; the detection circuit comprises an enable signal output terminal;

the enabling control signal output terminal of the detection circuit is electrically connected to the display driving integrated circuit through the flexible circuit board, and the detection circuit provides an enabling control signal for the enabling circuit through the flexible circuit board.

Figure 8:
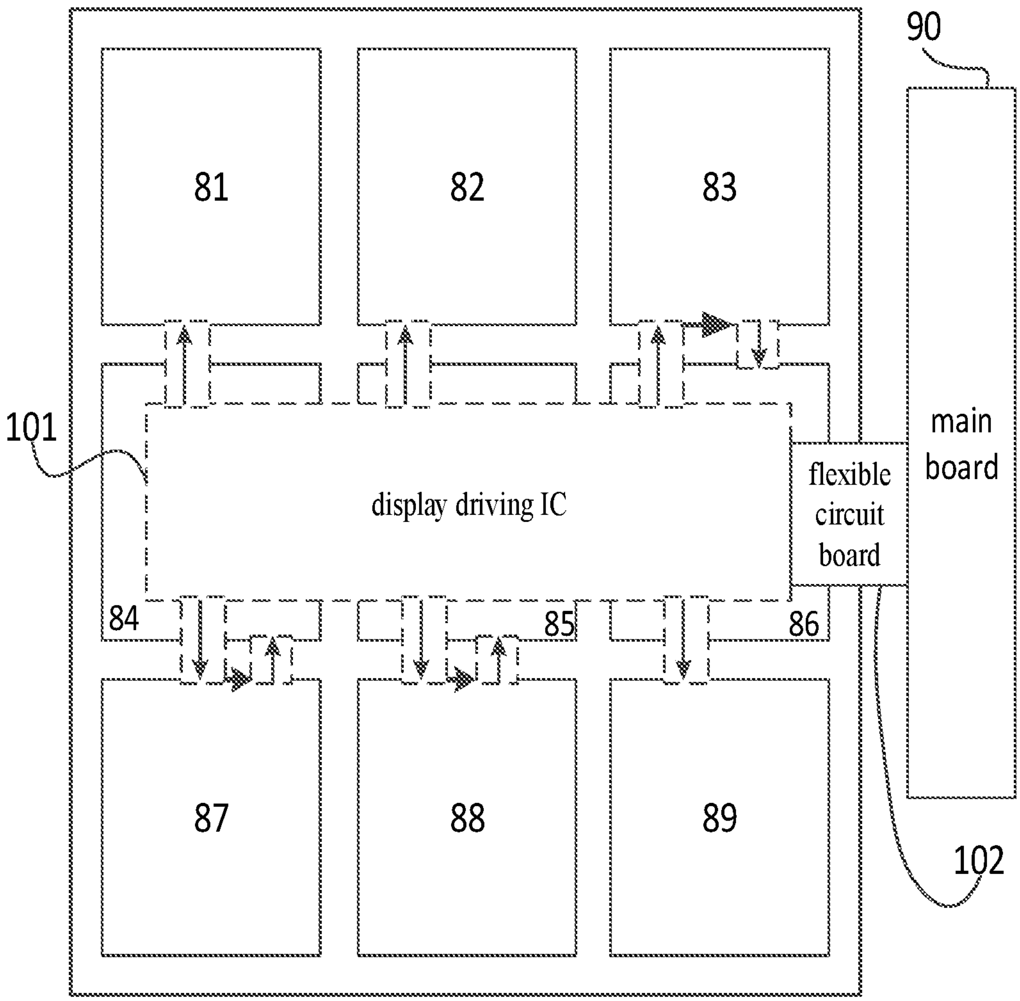
FIG. 8 is a schematic structural diagram of a splicing display device according to at least one embodiment of the present disclosure.

As shown in FIG. 8, the splicing display device 80 according to at least one embodiment of the present disclosure may include a first row and first column display panel 81, a first row and second column display panel 82, a first row and third column display panel 83, a second row and first column display panel 84, a second row and second column display panel 85, a second row and third column display panel 86, a third row and first column display panel 87, a third row and second column display panel 88, a third row and third column display panel 89, a main board 90, a display driving IC 101, and a flexible circuit board 102;

the main board 90 is electrically connected to the display driving integrated circuit 101 through the flexible circuit board 102;

the display driving integrated circuit 101 is electrically connected to the first row and first column display panel 81, the first row and second column display panel 82, the first row and third column display panel 83, the second row and first column display panel 84, the second row and second column display panel 85, the second row and third column display panel 86, the third row and first column display panel 87, the third row and second column display panel 88 and the third row and third column display panel 89, respectively, and is configured to provide a power supply voltage signal and a corresponding data voltage for the first row and first column display panel 81, the first row and second column display panel 82, the first row and third column display panel 83, the second row and first column display panel 84, the second row and second column display panel 85, the second row and third column display panel 86, the third row and first column display panel 87, the third row and second column display panel 88 and the third row and third column display panel 89, respectively;

the display driving integrated circuit 101 is further configured to provide a starting signal for the first row and first column display panel 81, the first row and second column display panel 82, the first row and third column display panel 83, the second row and first column display panel 84, the second row and second column display panel 85, the second row and third column display panel 86, the third row and first column display panel 87, the third row and second column display panel 88, and the third row and third column display panel 89 when receiving the enabling control signal.

In at least one embodiment shown in FIG. 8, the display driving IC 101 may be attached to the surfaces of the second row and first column display panel 84, the second row and second column display panel 85, and the second row and third column display panel 86 that are not used for displaying, and the display driving IC 101 is disposed between the first row display panel and the third row display panel, so that the distance between the ports between the display driving IC 101 and the rows of display panels in the column direction is not large, and the phenomenon of large difference between the voltage values of the power voltage signals received by the pixel circuits on the display panels can be improved.

In at least one embodiment shown in FIG. 8, the first direction may be a horizontal direction, and the second direction may be a vertical direction.

Figure 9:
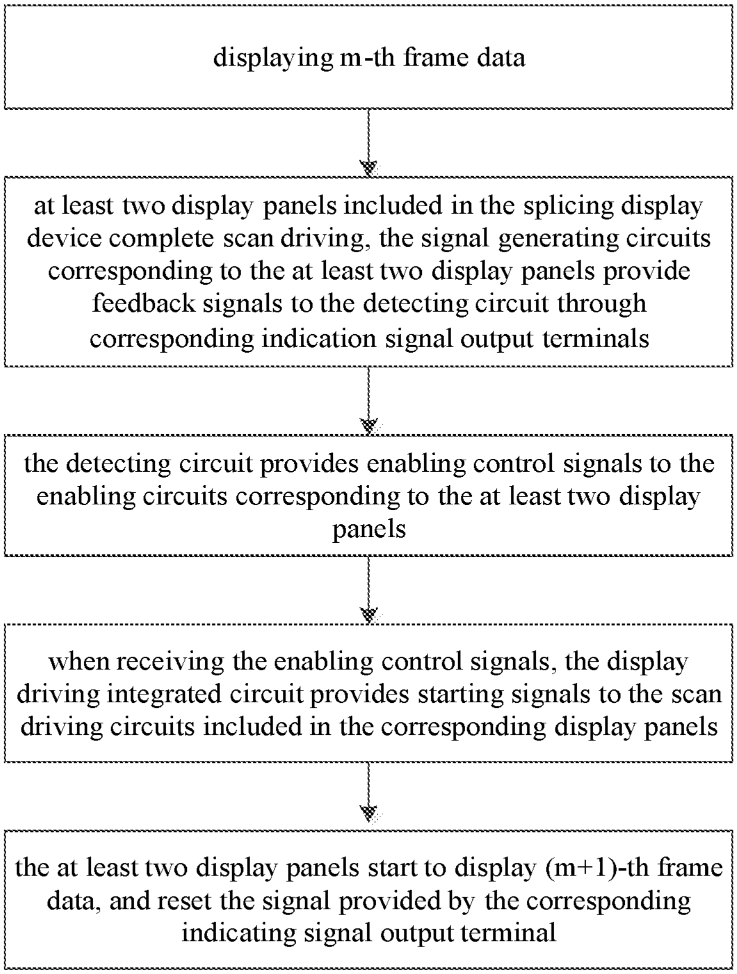
FIG. 9 is a flowchart illustrating an operation of a splicing display device according to at least one embodiment of the present disclosure.

As shown in FIG. 9, when the splicing display device according to the embodiment of the present disclosure is in operation, when displaying m-th frame data (m is a positive integer), when at least two display panels included in the splicing display device complete scan driving (that is, when a last-stage scan driving signal output terminal of a scan driving circuit in the at least two display panels outputs a valid scan driving signal), the signal generating circuits corresponding to the at least two display panels provide feedback signals to the detecting circuit through corresponding indication signal output terminals, the detecting circuit provides enabling control signals to the enabling circuits corresponding to the at least two display panels, and when receiving the enabling control signals, the display driving integrated circuit provides starting signals to the scan driving circuits included in the corresponding display panels, so that the at least two display panels start to display (m+1)-th frame data, and reset the signal provided by the corresponding indicating signal output terminal so as to carry out next synchronous display control.

The splicing display device provided by the embodiment of the disclosure can be any product or component with a display function, such as a mobile phone, a tablet computer, a television, a display, a notebook computer, a digital photo frame, a navigator and the like.

While the foregoing is directed to the preferred embodiment of the present disclosure, it will be appreciated that various modifications and adaptations may be made by those skilled in the art without departing from the principles of the disclosure and should be considered as within the scope of the disclosure.

What is claimed is:

1. A starting signal providing module, applied to a splicing display device, wherein the splicing display device comprises at least two display panels; the display panel comprises a scan driving circuit, the scan driving circuit is a gate driving circuit; the scan driving circuit comprises a plurality of cascaded scan driving units; the starting signal providing module comprises a detection circuit, a plurality of signal generating circuits and a plurality of enabling circuits; the signal generating circuit corresponds to the display panel, and the enabling circuit corresponds to the display panel and the signal generating circuit;

the signal generating circuit is configured to generate and provide a feedback signal to the detecting circuit when a last-stage scan driving signal output terminal of a scan driving circuit in a corresponding display panel outputs a valid scan driving signal;

the detection circuit is electrically connected to the plurality of signal generating circuits and is configured to provide an enabling control signal to enabling circuits corresponding to at least two signal generating circuits according to the feedback signals from at least two signal generating circuits;

the enabling circuit is configured to control a starting signal to be supplied to a scan driving circuit included in a corresponding display panel upon receiving the enabling control signal;

wherein the signal generating circuit comprises an indication signal output terminal, the signal generating circuit is electrically connected to a first-stage scan driving signal output terminal of the scan driving circuit in the corresponding display panel and the last-stage scan driving signal output terminal of the scan driving circuit in the corresponding display panel, for controlling a first voltage signal to be output through the corresponding indication signal output terminal when the first-stage scan driving signal output terminal outputs a valid scan driving signal, and controlling a second voltage signal to be output through the corresponding indication signal output terminal when the last-stage scan driving signal output terminal outputs a valid scan driving signal; the feedback signal is the second voltage signal;

the detection circuit comprises enabling control signal output terminals, the detection circuit is electrically connected to the indicating signal output terminals of the signal generating circuits, and is configured to provide enabling control signals for the enabling circuits corresponding to the at least two signal generating circuits through the enabling control signal output terminals when the indicating signal output terminals of the at least two signal generating circuits output second voltage signals;

the enabling circuit is electrically connected to the starting signal terminal and is configured to control the starting signal to be provided for a first-stage scan driving unit in the scan driving circuit included in the corresponding display panel through the starting signal terminal when the enabling control signal is received.

2. The starting signal providing module according to claim 1, wherein the signal generating circuit comprises a first generation circuit and a second generation circuit;

the first generating circuit is and electrically connected to a first voltage terminal, the corresponding indicating signal output terminal and a first-stage scan driving signal output terminal of the corresponding scan driving circuit in the display panel, and is configured to control a communication between the corresponding indicating signal output terminal and the first voltage terminal when the first-stage scan driving signal output terminal of the corresponding scan driving circuit in the display panel outputs a valid scan driving signal; the first voltage terminal is configured to provide the first voltage signal;

the second generating circuit is electrically connected to a second voltage terminal, the corresponding indicating signal output terminal and the last-stage scan driving signal output terminal of the corresponding scan driving circuit in the display panel, and is configured to control the communication between the corresponding indicating signal output terminal and the second voltage terminal when the last-stage scan driving signal output terminal of the corresponding scan driving circuit in the display panel outputs a valid scan driving signal; the second voltage terminal is configured to provide a second voltage signal.

3. The starting signal providing module according to claim 2, wherein the first generation circuit includes a first transistor, and the second generation circuit comprises a second transistor;

a control electrode of the first transistor is electrically connected to the first-stage scan driving signal output terminal of a scan driving circuit in the corresponding display panel, a first electrode of the first transistor is electrically connected to the first voltage terminal, and a second electrode of the first transistor is electrically connected to the corresponding indication signal output terminal;

a control electrode of the second transistor is electrically connected to the last-stage of scan driving signal output terminal of the scan driving circuit in the corresponding display panel, the first electrode of the second transistor is electrically connected to the second voltage terminal, and the second electrode of the second transistor is electrically connected to the corresponding indicating signal output terminal.

4. The starting signal providing module according to claim 1, wherein the enabling circuit comprises a third transistor;

a control electrode of the third transistor is electrically connected to the enabling control signal output terminal, a first electrode of the third transistor is electrically connected to the starting signal terminal, and a second electrode of the third transistor is electrically connected to an input terminal of a first-stage scan driving unit in a scan driving circuit included in the corresponding display panel;

the starting signal terminal is configured to provide a starting signal.

5. The starting signal providing module according to claim 1, wherein the detection circuit comprises an OR-gate and an enabling control signal generating circuit; the first voltage signal is a high voltage signal, and the second voltage signal is a low voltage signal;

a plurality of input terminals of the OR-gate is respectively electrically connected to the indicating signal output terminals of the plurality of signal generating circuits, and the output terminal of the OR-gate is electrically connected to the enabling control signal generating circuit;

the enabling control signal generating circuit is electrically connected to the enabling control signal output terminal and is configured to control the enabling control signal to be output through the enabling control signal output terminal when the output terminal of the OR-gate outputs a low-voltage signal.

6. The starting signal providing module according to claim 1, wherein the signal generating circuit is disposed in a peripheral region of the corresponding display panel.

7. A starting signal providing method applied to the starting signal providing module according to claim 1, the starting signal providing method comprises:

when the last-stage of scan driving signal output terminal of the scan driving circuit in the corresponding display panel outputs a valid scan driving signal, the signal generating circuit generates and provides a feedback signal for the detection circuit;

the detection circuit provides enabling control signals to enabling circuits corresponding to at least two signal generating circuits according to the feedback signals from the at least two signal generating circuits;

when the enabling circuit receives the enabling control signal, controlling to provide a starting signal to a scan driving circuit included in the corresponding display panel;

the starting signal providing method further comprises:

when the first-stage scan driving signal output terminal of the corresponding scan driving circuit in the display panel outputs a valid scan driving signal, the signal generating circuit controlling to output a first voltage signal through the corresponding indication signal output terminal, and when the last-stage scan driving signal output terminal of the corresponding scan driving circuit in the display panel outputs a valid scan driving signal, the signal generating circuit controlling to output a second voltage signal through the corresponding indication signal output terminal; the feedback signal is the second voltage signal;

when the indicating signal output terminals of at least two signal generating circuits output second voltage signals, the detection circuit providing enabling control signals for enabling circuits corresponding to the at least two signal generating circuits;

when the enabling circuit receives the enabling control signal, the enabling circuit controlling to provide a starting signal to a first-stage scan driving unit in a scan driving circuit included in the corresponding display panel through the starting signal terminal.

8. A splicing display device comprising the starting signal providing module according to claim 1.

9. The splicing display device according to claim 8, further comprising a main board and a display driver integrated circuit; the detection circuit included by the starting signal providing module is arranged on the mainboard; the enabling circuit is electrically connected to the starting signal terminal;

the detection circuit is further configured to provide an enabling control signal to the display driving circuit;

the display driving integrated circuit is configured to provide a starting signal to the starting signal terminal when receiving the enabling control signal.

10. The splicing display device according to claim 9, further comprising N rows of at least one column of display panels; the spliced display device comprises N display driving integrated circuits; n is a positive integer; the number of the display panels included in the splicing display device is at least two;

the display driving integrated circuit corresponds to one row of the display panel;

the display driving integrated circuit is electrically connected to the corresponding row display panel through the starting signal terminal and is configured to provide a corresponding starting signal for the scan driving circuit in the corresponding row display panel through the starting signal terminal when the enabling control signal is received;

the display panel includes a gate line extending in a row direction and a power voltage line extending in a column direction.

11. The splicing display device according to claim 10, further comprising N flexible circuit boards; the flexible circuit board corresponds to the display driving integrated circuit; the detection circuit comprises an enabling control signal output terminal;

the enabling control signal output terminal of the detection circuit is electrically connected to the corresponding display driving integrated circuit through the flexible circuit board, and the detection circuit provides the enabling control signal for the corresponding display driving integrated circuit through the flexible circuit board.

12. The splicing display device according to claim 9, further comprising at least two display panels; the spliced display device comprises the display driving integrated circuit;

the display driving integrated circuit is electrically connected to the at least two display panels through the starting signal terminal and is configured to provide corresponding starting signals for scan driving circuits in the at least two display panels through the starting signal terminal when the enabling control signals are received.

13. The splicing display device according to claim 12, further comprising a flexible circuit board; the detection circuit comprises an enabling control signal output terminal;

the enabling control signal output terminal of the detection circuit is electrically connected to the display driving integrated circuit through the flexible circuit board, and the detection circuit provides an enabling control signal for the enabling circuit through the flexible circuit board.

* * * * *